(12) United States Patent
Cordell et al.

(10) Patent No.: US 9,661,141 B1
(45) Date of Patent: *May 23, 2017

(54) MANAGING AGENT LOGIN TO MULTIPLE CONFERENCE CALL BRIDGES

(71) Applicant: ALORICA BUSINESS SOLUTIONS, LLC, Irvine, CA (US)

(72) Inventors: Jeffrey William Cordell, Omaha, NE (US); Kevin Peter Pierson, Omaha, NE (US); Larry Trent Larson, Bennington, NE (US); Timothy Wayne Starbuck, Bellevue, NE (US); James Kevin Andrews, Omaha, NE (US); Anthony Mathew Stach, Omaha, NE (US)

(73) Assignee: ALORICA BUSINESS SOLUTIONS, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/019,545

(22) Filed: Feb. 9, 2016

Related U.S. Application Data

(63) Continuation of application No. 11/951,433, filed on Dec. 6, 2007, now Pat. No. 9,258,181.

(51) Int. Cl.
*H04M 3/00* (2006.01)
*H04M 5/00* (2006.01)
(Continued)

(52) U.S. Cl.
CPC .... *H04M 3/565* (2013.01); *G06Q 10/063112* (2013.01); *G06Q 10/063114* (2013.01);
(Continued)

(58) Field of Classification Search
CPC ....... H04M 1/274575; H04M 1/72586; H04M 2203/60; H04M 2203/2072; H04M 2203/2094; H04M 2203/5054; H04M 2242/30; H04M 2250/62; H04M 3/42; H04M 3/4234; H04M 3/42221; H04M 3/42246; H04M 3/42348; H04M 3/42357; H04M 3/42374; H04M 3/4931; H04M 3/56; H04M 3/562; H04M 3/563; H04M 3/564; H04M 3/565; H04M 3/566; H04M 3/567; H04M 3/568; H04M 7/006; H04M 7/15;
(Continued)

(56) References Cited

U.S. PATENT DOCUMENTS

| | | | | |
|---|---|---|---|---|
| 5,452,348 A | * | 9/1995 | Adams | H04M 3/56 379/202.01 |
| 6,181,786 B1 | * | 1/2001 | Detampel, Jr. | H04M 3/56 370/261 |

(Continued)

*Primary Examiner* — Khai N Nguyen

(57) ABSTRACT

A method, a computer readable medium, and a system for managing agent login to multiple bridges are provided. The method comprises reserving at least one bridge for at least one agent, creating a first queue for the at least one bridge, the first queue comprising the at least one agent, monitoring efficiency of the at least one bridge, determining if a need for a first bridge of the at least one bridge is high, creating a second queue for the first bridge of the at least one bridge if the need for the first bridge of the at least one bridge is high, assigning at least one agent from the first queue to the second queue, and moving the at least one agent up in the second queue.

20 Claims, 6 Drawing Sheets

(51) Int. Cl.
*H04M 3/42* (2006.01)
*H04M 3/56* (2006.01)
*H04M 3/523* (2006.01)
*H04M 3/51* (2006.01)
*H04M 3/22* (2006.01)
*G06Q 10/06* (2012.01)

(52) U.S. Cl.
CPC .. *G06Q 10/063116* (2013.01); *H04M 3/2218* (2013.01); *H04M 3/42204* (2013.01); *H04M 3/5175* (2013.01); *H04M 3/523* (2013.01)

(58) Field of Classification Search
CPC ............... H04M 7/146; H04M 7/1235; H04M 2203/2011; H04M 2203/2061; H04M 2242/00; H04M 2242/08; H04M 2242/12; H04L 12/18; H04L 12/1813; H04L 12/581; H04L 47/78; H04L 47/80; H04L 51/04; H04L 63/10; H04L 63/104; H04L 63/107; H04L 65/1053; H04L 65/403; H04L 67/18; H04L 67/24; H04W 12/08; H04W 4/02; H04W 4/06; H04W 4/08; G10L 15/00; G06Q 10/06
USPC ............... 379/90.01, 93.01, 93.21, 157, 158, 379/201.01, 202.01, 207.01, 210.01, 379/265.01, 265.02, 265.03, 265.04, 379/265.05, 265.06, 265.07, 265.08, 379/265.09, 265.1, 265.11, 265.12, 379/265.13, 265.14, 26, 6.01, 266.02, 379/266.03, 266.04, 266.05, 266.06, 379/266.07, 266.08, 266.09, 266.1; 370/259, 260, 261, 262; 455/411, 414.1, 455/416, 566; 709/225
See application file for complete search history.

(56) References Cited

U.S. PATENT DOCUMENTS

| | | | | |
|---|---|---|---|---|
| 6,584,076 | B1* | 6/2003 | Aravamudan | H04M 3/56 370/260 |
| 6,728,221 | B1* | 4/2004 | Shaffer | H04M 3/56 370/260 |
| 6,842,505 | B1* | 1/2005 | Suder | H04M 3/54 379/201.01 |
| 8,266,535 | B2* | 9/2012 | Brown | H04M 3/56 715/751 |
| 9,300,790 | B2* | 3/2016 | Gainsboro | H04M 3/2281 |
| 2001/0002927 | A1* | 6/2001 | Detampel, Jr. | H04M 3/56 379/202.01 |
| 2003/0007606 | A1* | 1/2003 | Suder | H04M 3/20 379/32.04 |
| 2006/0291637 | A1* | 12/2006 | Erickson | H04M 3/2218 379/202.01 |
| 2007/0071206 | A1* | 3/2007 | Gainsboro | H04M 3/2281 379/168 |
| 2008/0065998 | A1* | 3/2008 | Brown | H04M 3/56 715/755 |

* cited by examiner

MANAGING AGENT LOGIN TO MULTIPLE CONFERENCE CALL BRIDGES

CROSS REFERENCE TO RELATED APPLICATIONS

The present application is a continuation of U.S. Ser. No. 11/951,433, filed Dec. 6, 2007, entitled MANAGING AGENT LOGIN TO MULTIPLE CONFERENCE CALL BRIDGES, issued U.S. Pat. No. 9,258,181, issued Feb. 9, 2016. The present application is also related to commonly assigned U.S. Ser. No. 11/942,758, entitled MULTI-DOMAIN LOGIN AND MESSAGING, filed Nov. 20, 2007, issued U.S. Pat. No. 8,079,066, issued Dec. 13, 2011 and U.S. Ser. No. 11/942,760 entitled MULTI-DOMAIN LOGIN, MESSAGING, AND PRESENCE REGISTRATION, filed Nov. 20, 2007 and U.S. Ser. No. 11/942,759 entitled MAINTAINING PER-SEAT LICENSING ACROSS MULTIPLE HOME AGENTS, filed Nov. 20, 2007, the entire contents of which are incorporated by reference herein.

FIELD OF THE DISCLOSURE

The present disclosure relates generally to an improved multiple bridges login procedure. Still more particularly, the present disclosure provides a method, a system, and a computer readable medium comprising instructions for managing agent login to multiple bridges.

BACKGROUND OF THE DISCLOSURE

Historically, management and communications with a large employee workforce has been a complex and time-consuming task. With regard to managing large groups of employees, it is difficult to predict which applications they will need access to or data from or what employee preferences would be from day to day. Additionally, appropriate and timely communication with a set of workers can be time consuming and difficult.

The current state of the art for login of employees to multiple domains, applications and environments is the limitations of one operator workstation per conference call bridge. A conference call bridge is a bridge that connects and controls conference call operations between a group of participants and agents. Each conference call bridge is also statically mapped to the agent. These limitations prevent management of the agents from reassigning an agent to another conference call bridge dynamically. In addition, because of these limitations, a new agent may not be able to log into a conference call bridge timely if the existing agent fails to log off the workstation correctly.

A need was felt for a supervisor to manage a pool of agents. The supervisor should have the ability to define in scheduling an automated process to assign agents to conference call bridges. Based on the credentials of the agents, the process should be able to log the agents into correct bridges automatically. Therefore, what is needed is a solution that overcomes the static mapping and workstation per bridge limitations currently experienced. This solution should allow dynamic mapping of agents to bridges and provide supervisors the ability to determine agent status and availability.

SUMMARY OF THE DISCLOSURE

A method for managing agent login is provided. In one embodiment, the method comprises reserving at least one bridge for at least one agent, creating a first queue for the at least one bridge, the first queue comprising the at least one agent, monitoring efficiency of the at least one bridge, determining if a need for a first bridge of the at least one bridge is high, creating a second queue for the first bridge of the at least one bridge if the need for the first bridge of the at least one bridge is high, assigning at least one agent from the first queue to the second queue, and moving the at least one agent up in the second queue.

In an alternative embodiment, the method comprises reserving at least one bridge for at least one agent, creating a first queue for the at least one bridge comprising the at least one agent based on a need for the at least one agent, monitoring efficiency of the at least one bridge, creating a second queue for the at least one bridge, and assigning a portion of the at least one agent from the first queue to the second queue.

In yet another embodiment, the method comprises selecting an agent from a plurality of agents for a conference call, creating a queue for a conference call bridge of the conference call, assigning the agent to the queue, and moving the agent assigned to the conference call bridge up in the queue.

A system for managing agent login is also provided. The system comprises at least one agent, at least one bridge for connecting the at least one agent to at least one conference call, and a virtual application for logging the at least one agent into the at least one bridge. The virtual application is communicably coupled to the at least one agent and the at least one bridge. The virtual application is operable to detect authentication of the at least one agent, perform a single sign-on of the at least one agent, and automatically log the at least one agent into the at least one bridge based on efficiency of the at least one bridge.

A computer readable medium comprising instructions for reserving at least one bridge for at least one agent, creating a first queue for the at least one bridge, the first queue comprising the at least one agent, monitoring efficiency of the at least one bridge, determining if a need for a first bridge of the at least one bridge is high, creating a second queue for the first bridge of the at least one bridge if the need for the first bridge of the at least one bridge is high, assigning at least one agent from the first queue to the second queue, and moving the at least one agent up in the second queue.

DETAILED DESCRIPTION OF THE INVENTION

Figure 1:
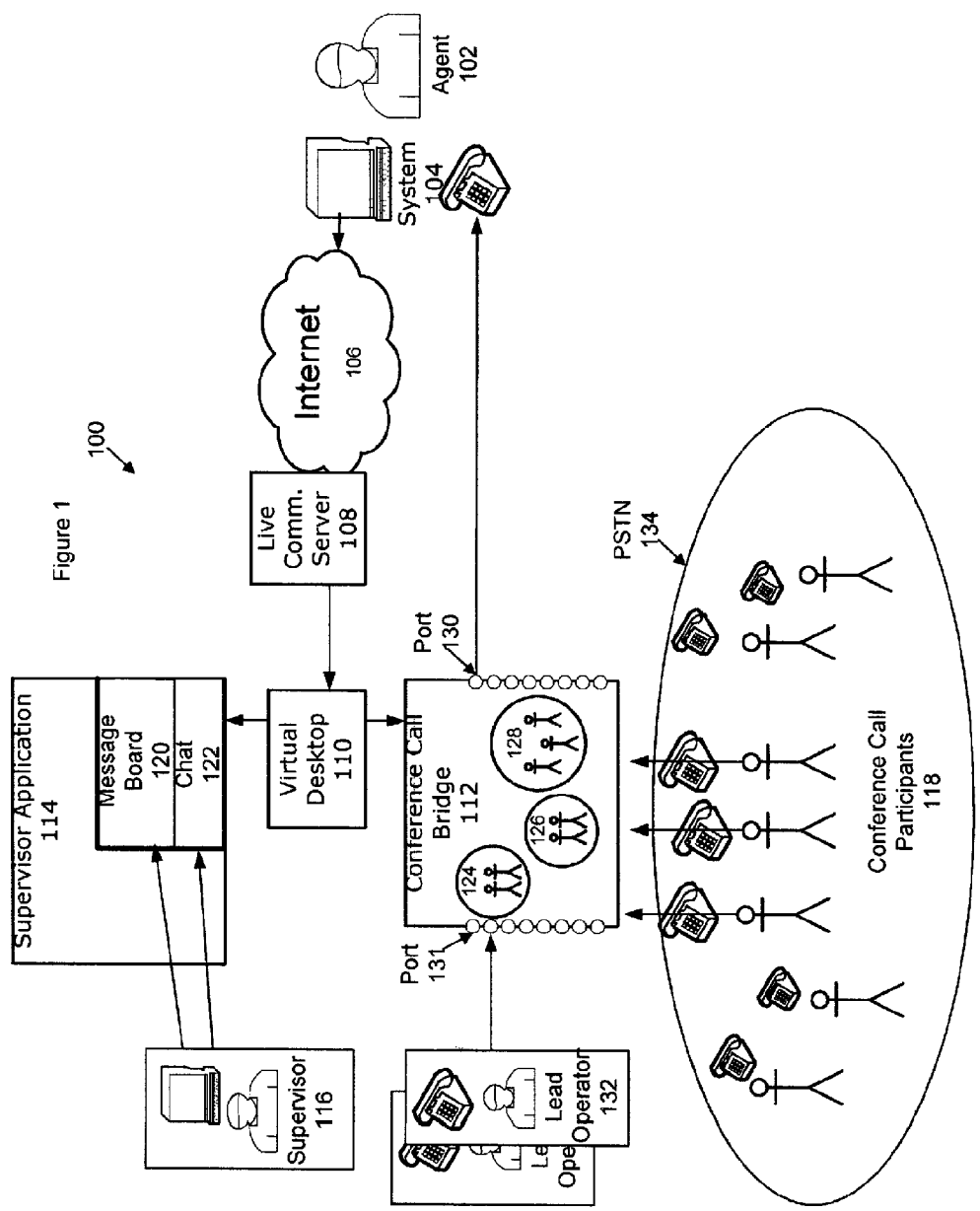
FIG. 1 depicts a system for managing agent login to a conference call bridge in accordance with an embodiment of the disclosure.

With reference to the figures and in particular with reference to FIG. 1, a diagram of a system for managing agent login to a conference call bridge is depicted in accordance with an embodiment of the disclosure. In system 100, the agent 102 interacts with a system 104 that is communicably coupled through the internet 106 to the live communication server 108. System 104 may be a data processing system, such as a desktop computer, a laptop computer, an Internet protocol-enabled device, such as an IP-enabled telephone, or any other type of device capable of sending and receive information via a wired or wireless protocol. The communication server 108 connects agent 102 with a virtual desktop 110, which authenticates and registers agents with a conference call bridge 112. Virtual desktop 110 also communicates with supervisor application 114. Supervisor application 114 is utilized by supervisor 116 to assign agents to conference call bridge 112 in order to communicate with conference call participants 118. Supervisor 116 may communicate with agents via different features of the supervisor application 114, for example, posting messages to agents on the message board 120 or conducting an online chat conversation with agents via a chat 122.

Conference call bridge 112 may handle one or more conference calls, for example, conference calls 124, 126 and 128 at the same time. To connect agent 102 to a conference call, virtual desktop 112 connects agent 102 to a port 130 of the conference call bridge 112. Lead operator 132 then connects conference call participants 118 to the same conference call via a telephone connection, such as a public switched telephone network (PSTN) connection 134. Lead operator 132 is communicably coupled to the conference call bridge 112 via a port 131. However, conference call bridge 112 is currently limited to a single agent workstation. Thus, conference call bridge 112 is statically mapped to agent 102. These limitations prevent supervisor 116 from reassigning agent 102 to another conference call bridge dynamically. In addition, because of the static mapping, an agent who fails to log off correctly may prevent a new agent from logging into the conference call bridge 112.

It is noted that the transfer of information between system 104, live communication server 108, supervisor application 114, virtual desktop 110, and conference call bridge 112, may be accomplished via at least one of a wireless protocol, a wired protocol and a combination of a wireless protocol and a wired protocol. An example of a wired protocol is the Internet protocol (IP). The steps performed in this figure may be performed by software, hardware, firmware, and/or the combination of software, hardware, and/or firmware.

Figure 2:
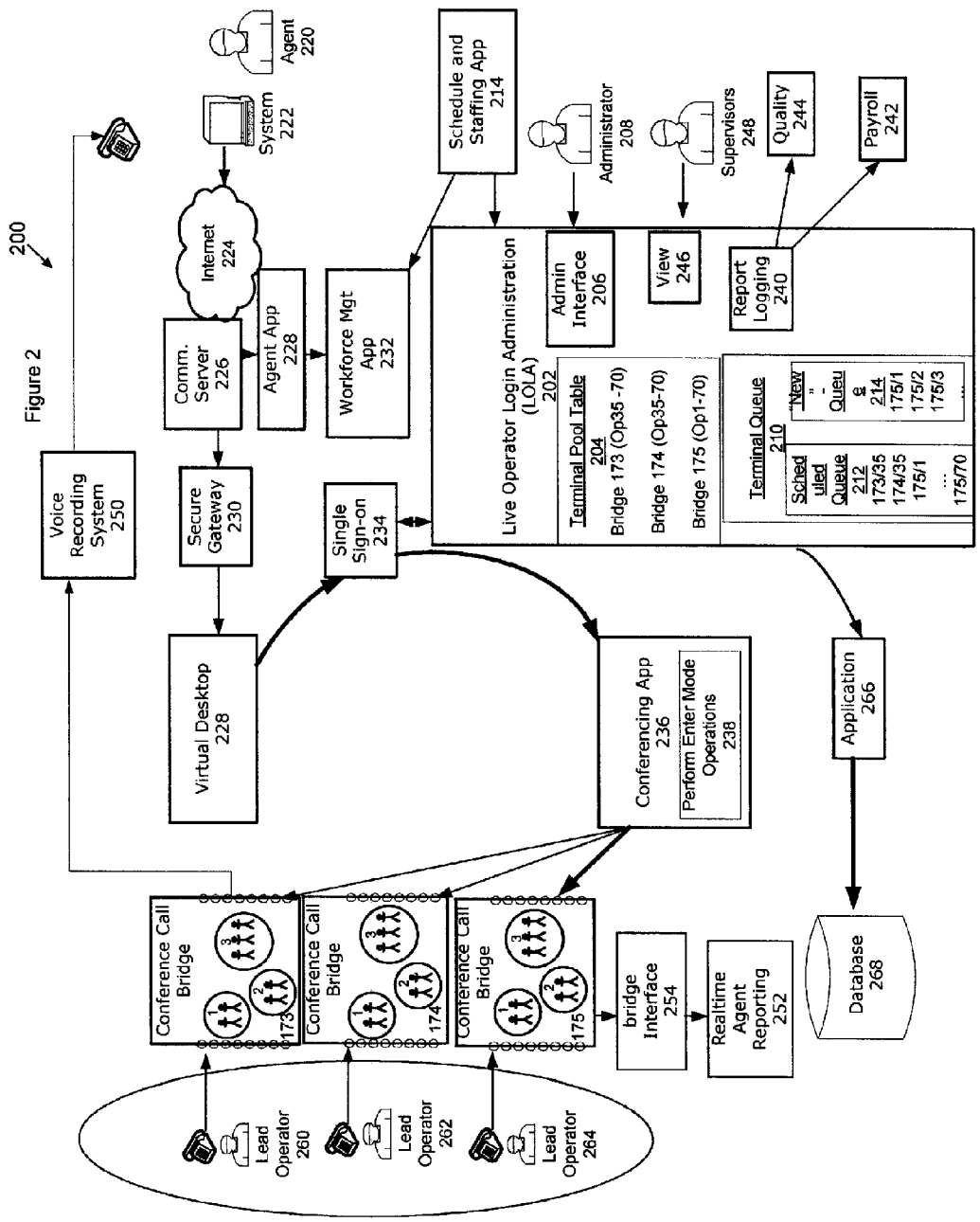
FIG. 2 depicts a system for managing agent login to multiple conference call bridges in accordance with an embodiment of the disclosure.

An aspect of the present disclosure provides a method for managing agent login into multiple conference call bridges, such that the agent may automatically be logged into a conference call bridge based on the efficiency of the conference call bridge. With reference now to FIG. 2, a diagram of a system for managing agent login to multiple conference call bridges is depicted in accordance with an embodiment of the disclosure.

System 200 comprises a management tool live operator login administration (LOLA) 202. LOLA 202 operates across multiple conference call bridges and manages agent logins based on their positions in the queues of the conference call bridges. LOLA 202 comprises a terminal pool table 204 that enables reservation of a conference call bridge and its assignment to a pool of agents. For example, conference call bridge 173 may be assigned to agents 35 to 70, conference call bridge 174 may be assigned to agents 35 to 70, and conference call bridge 175 may be assigned to agents 1 to 70. In addition, LOLA 202 provides an administration interface 206 for administrators 208 to manage the pool of agents who have been assigned to the queues.

LOLA 202 also comprises a terminal queue 210 to enable routing of agents to conference call bridges based on an algorithm, for example, a round robin algorithm. Alternatively, the terminal queue 210 may route agents based on the efficiency of the conference call bridges. For example, if a conference call bridge has a high number of agents in its queue, LOLA 202 may set up a new queue to handle that conference call bridge first before other bridges. In one example, a scheduled queue 212 indicates that conference call bridge 175 has a high number of agents in its queue while conference call bridges 173 and 174 each has only one agent in their queues. The scheduled queue 212 is managed by schedule and staffing application 214, which plans and sets up agent-to-bridge mapping and assigns agent to the appropriate bridge based on the skill or credentials of the agent. Upon determining a need for conference call bridge 175, LOLA 202 sets up a new queue 214 to route agents to conference call bridge 175 and moves the agent assignment up in the new queue 214. In this way, agents assignments to conference call bridges may be performed dynamically based on the need for the bridges.

When agent 220 interacts with a system 222 to communicate with the live communication server 226. Live communication server 226 connects agent 220 to virtual desktop 228 via secure gateway 230. In addition, live communication server 226 logs agent 220 into agent application 228, which communicates with workforce management application 232 to register its status with schedule and staffing application 214. Virtual desktop 228 then logs agent 220 into a correct conference call bridge by utilizing single sign-on 234. Single sign-on 234 comprises credentials of the agent 220 and consults with LOLA 202 for dynamic assignment of agent 220 using the credentials. Upon receiving an assignment of a conference call bridge, single sign-on 234 logs agent 220 into the correct conference call bridge automatically using conferencing application 236. Conferencing application 236 performs enter-mode operations 238 to connect agent 220 to the correct conference call bridge, for example, conference call bridge 175, to communicate with conference call participants.

In addition to routing agents to bridges, LOLA 202 also provides a report logging function 240 to log activities performed by LOLA 202 and store the activities in a payroll file 242 for later processing. Report logging function 240 further provides a quality report 244 that reconciles between time spent by the agent 220 and files generated by conferencing application 236. Data may be filtered from these files to create billable entries including the agent's pay per talk minute. Furthermore, LOLA 202 provides a bridge view 246, which enables supervisors 248 to monitor statuses of agents based on their positions with the bridges. LOLA 202 may also communicate with application 266, which analyzes activities generated by LOLA 202, stores data in database 268, and generates a composite view of the activities for supervisors 248 or administrators 208.

Once agent 220 connects to the correct conference call bridge, a recording of the conference call may be made by dialing a predetermined number through a voice recording system 250 to the agent 220. In addition, real time agent reporting 252 is performed by monitoring on position status, agent status, and productivity via a bridge interface 254.

Figure 3:
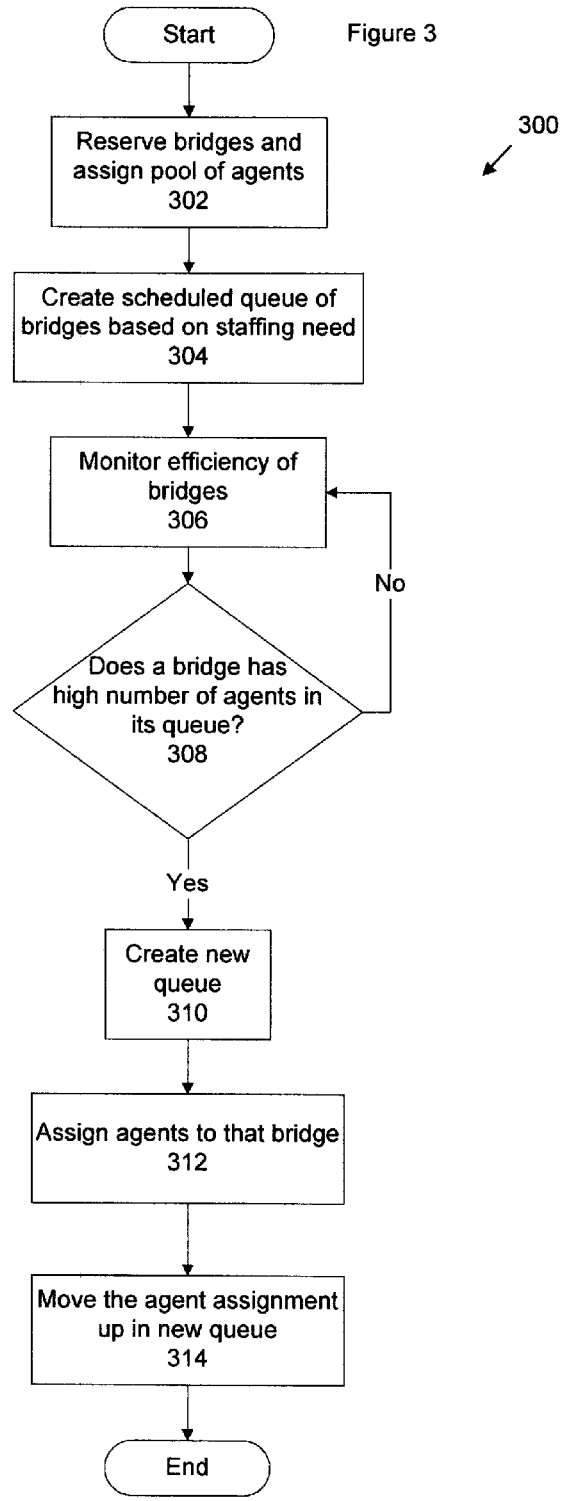
FIG. 3 depicts a flowchart of a process for managing agent login to multiple bridges in accordance with an embodiment of the disclosure.

With reference now to FIG. 3, a flowchart of a process for managing agent login to multiple bridges is depicted in accordance with an embodiment of the disclosure. In this embodiment, process 300 may be implemented as instructions embodied in a computer readable medium executing within system 200 by an application, such as LOLA 202. Process 300 begins at step 302 to reserve conference call bridges and assign a pool of agents to each of the bridges. Next, process 300 continues to step 304 to create a scheduled queue based on staffing need. The staffing need may be determined ahead of time by supervisors of the agents and provided via the schedule and staffing application 214.

Process 300 then continues to step 306 to monitor the efficiency of the bridges. This step may be accomplished based on the information obtained from the real-time agent reporting function 252. Next, process 300 continues to step 308 to determine if a conference call bridge has a high number of agents in its queue. A conference call bridge having a high number of agents in its queue means that conference call bridge is in need. If the conference call bridge has a high number of agents in its queue, process 300 continues to step 310 to create a new queue and to step 312 to assign the agents to that conference call bridge. However, if the conference call bridge does not have a high number of agents in its queue, the process returns to step 306 to continue monitoring efficiency of the bridges. Process 300 then completes at step 314 to move the agent assignment for that bridge up in the new queue, such that agents belonging to the bridge in need are handled prior to those belonging to other bridges.

Figure 4:
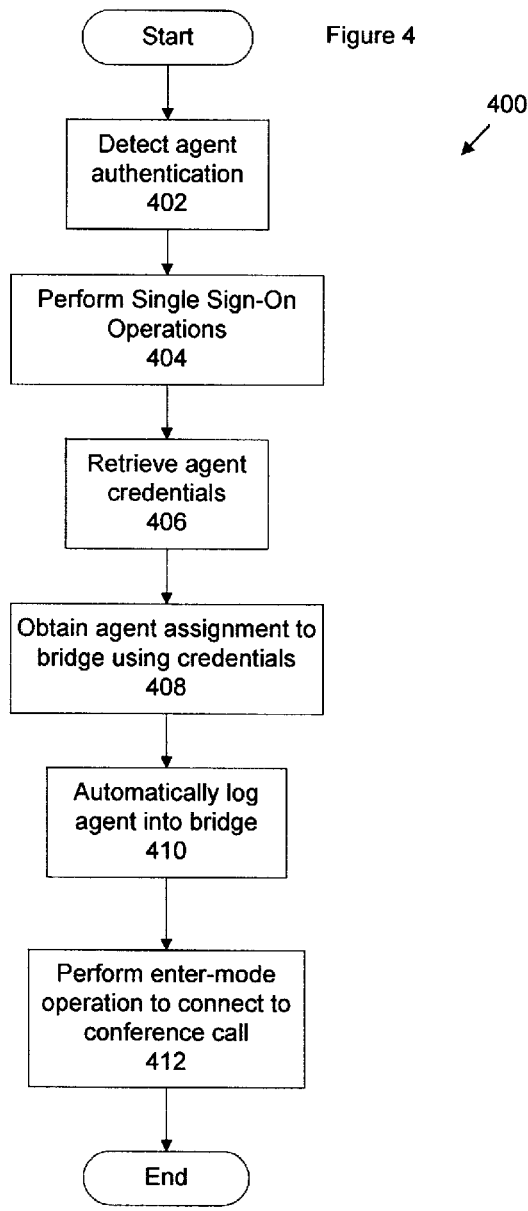
FIG. 4 depicts a flowchart of a process for automatic agent login to multiple bridges in accordance of an embodiment of the present disclosure.

With reference to FIG. 4, a flowchart of a process for automatic agent login to multiple bridges is depicted in accordance of an embodiment of the present disclosure. In this embodiment, process 400 may be implemented as instructions embodied in a computer readable medium executing within system 200 by an application, such as virtual desktop 228 and conference application 236. Process 400 begins at step 402 to detect authentication of an agent. For example, agent 220 may perform authentication with virtual desktop 228 via a secure gateway 230.

Next, process 400 continues to step 404 to perform single sign-on operations. To perform single sign-on, process 400 continues to step 406 to retrieve credentials of the agent and to step 408 to obtain assignment of the agent to a conference call bridge using the credentials. The assignment may be obtained from LOLA 202. Process 400 then continues to step 410 to automatically log the agent into the assigned conference call bridge. Process 400 then completes at step 412 to perform enter-mode operations to connect the agent to the conference call.

As discussed above, lead operator connects conference call participants to a conference call bridge. Lead operator of each conference call bridge also manages operations of the conference call, for example, conducting the call, removing participants from the call, or select certain participants for a private conference call. Lead operators, such as lead operators 260, 262, and 264, may pull certain conference call participants out of the conference call of a conference call bridge and talk to them individually, for example, to determine quality of the agent.

Figure 5:
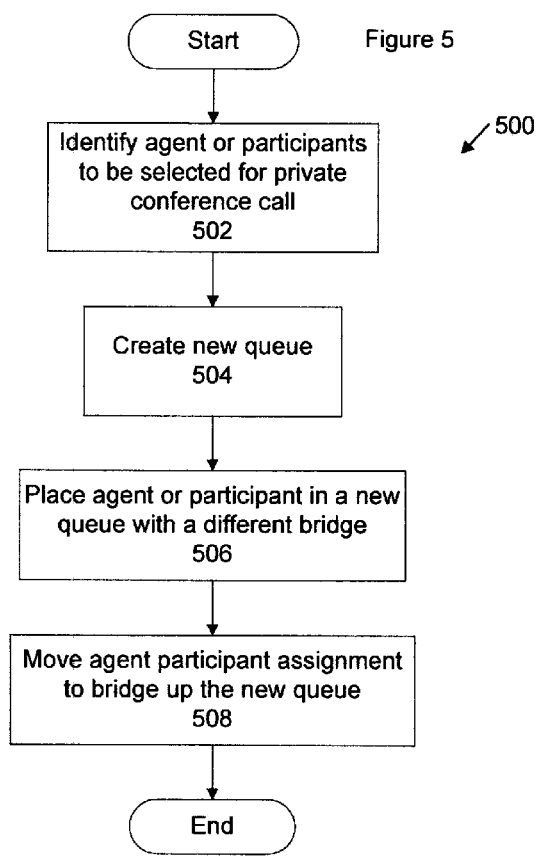
FIG. 5 depicts a flowchart of a process for selecting certain participants from a conference call for a private conference call in accordance with an embodiment of the present disclosure.

Referring to FIG. 5, a flowchart of a process for selecting certain participants from a conference call for a private conference call is depicted in accordance with an embodiment of the present disclosure. In this embodiment, process 500 may be implemented as instructions embodied in a computer readable medium executing within system 200 by an application, such as LOLA 202. Process 500 begins at step 502 to identify agent or participants to be selected for the private conference call. Process 500 then continues to step 504 to create a new queue and to step 506 to place the selected agent or participants in the new queue with a different conference call bridge. Process 500 then completes at step 508 to move the agent/participant assignment to conference call bridge up the new queue.

Figure 6:
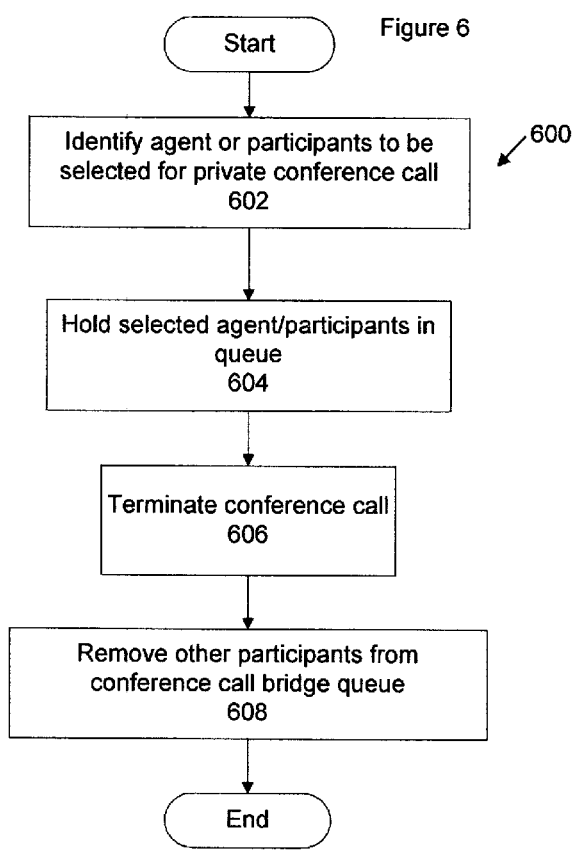
FIG. 6 depicts a flowchart of a process for selecting certain participants from a conference call for private conference call in accordance with an alternative embodiment of the present disclosure.

Referring to FIG. 6, a flowchart of a process for selecting certain participants from a conference call for private conference call is depicted in accordance with an alternative embodiment of the present disclosure. In this embodiment, process 600 may be implemented as instructions embodied in a computer readable medium executing within system 200 by an application, such as LOLA 202. Process 600 begins at step 602 to identify the agent or participants to be selected for a private conference call. Next, process 600 continues to step 604 to hold the selected agent or participants in the queue. Process 600 then continues to step 606 to terminate the conference call and completes at step 608 to remove other participants from the queue for the conference call bridge. Similar to the above, agents who fail to log off correctly may be removed from the conference call bridge by removing the agent-bridge assignment from the queue based on real time agent reporting 252.

In summary, the present disclosure a method, a system, and computer readable instructions for managing agent login to multiple bridges. In one embodiment, a management tool, such as live operator login administration, is provided to perform real time agent bridge assignment based on efficiency of the conference call bridge. In addition, LOLA provides various reports to administrators and supervisors for billing and quality purposes. Furthermore, LOLA enables operators of conference calls to select certain agents or participants for a private conference call.

Although the above descriptions set forth preferred embodiments, it will be understood that there is no intent to limit the embodiment of the disclosure by such disclosure, but rather, it is intended to cover all modifications, substitutions, and alternate implementations falling within the spirit and scope of the embodiment of the disclosure. The embodiments are intended to cover capabilities and concepts whether they be via a loosely coupled set of components or they be converged into one or more integrated components, devices, circuits, and/or software programs.

What is claimed is:

1. A method of a communication device, comprising:
reserving, by a processor of the communication device, a plurality of conference call bridges associated with a plurality of agents;
creating, by the processor, a first queue for the plurality of conference call bridges and assigning the plurality of agents that are associated with the plurality of conference call bridges to the first queue;
determining, by the processor, whether a first conference call bridge of the plurality of conference call bridges is associated with a higher number of agents in the first queue than other conference call bridges;
creating, by the processor, a second queue for the plurality of conference call bridges;
assigning, by the processor, the agents associated with the first conference call bridge from the first queue to the second queue; and
increasing, by the processor, a priority of agents associated with a busier conference call bridge over agents associated with the other conference call bridges by moving agent assignments for the agents associated with the first conference call bridge up in the second queue.

2. The method of claim 1, wherein the first queue is created by a schedule and staffing application of the computing device based on credentials of the one or more agents.

3. The method of claim 1, further comprising:
performing logging of activities; and
storing the logging of activities in a payroll file.

4. The method of claim 1, further comprising:
generating a quality report reconciling time spent by one or more agents and files generated by a conferencing application of the computing device; and
filtering data from the quality report to create billable entries.

5. The method of claim 1, further comprising:
generating a view for at least one conference call bridge; and
displaying the view to a system of a supervisor of the one or more agents.

6. The method of claim 1, further comprising:
communicating with an application to analyze activities of one or more conference call bridges;
storing the activities in a database; and
generating a composite view of the activities for a system of a supervisor of the one or more agents.

7. The method of claim 1, further comprising:
detecting authentication of one or more agents;
performing a single login for the one or more agents; and
automatically logging the one or more agents into the first conference call bridge.

8. The method of claim 7, wherein the performing of the single login comprises:
retrieving credentials of the one or more agents; and
obtaining assignment of the one or more agents from the second queue using the credentials.

9. The method of claim 7, further comprising:
dialing a predetermined number through a voice recording system to the one or more agents; and
recording a conference call of the first conference call bridge.

10. The method of claim 7, further comprising monitoring a status of the first queue, statuses of the one or more agents, and productivity of the one or more agents.

11. The method of claim 1, further comprising:
identifying one or more agents for a private conference call;
creating a third queue for a second conference call bridge; and
assigning the one or more agents from the second queue to the third queue,
wherein the one or more agents associated with the second conference call bridge have a higher priority than one or more agents associated with the other conference call bridges in the second queue.

12. The method of claim 1, further comprising:
selecting at least one agent for a private conference call;
holding the at least one agent in the second queue;
terminating a conference call of the first conference call bridge; and
removing other participants of the conference call from the second queue.

13. A method of a communication device, comprising:
reserving, by a processor of the communication device, a plurality of conference call bridges associated with a plurality of agents;
creating, by the processor, a first queue for the plurality of conference call bridges and assigning the plurality of agents that are associated with the plurality of conference call bridges to the first queue;
creating, by the processor, a second queue for the plurality of conference call bridges; and
increasing, by the processor, a priority of one or more agents associated with a busier conference call bridge over agents associated with other conference call bridges by assigning the one or more agents from the first queue to the second queue.

14. A method of a communication device, comprising:
creating, by a processor of the communication device, a first queue for a plurality of conference call bridges associated with a plurality of conference calls;
assigning, by the processor, at least one agent associated with a conference call bridge to the first queue;
moving, by the processor, the at least one agent associated with the conference call bridge up in the first queue;
determining whether the conference call bridge is associated with a higher number of agents in the first queue than other conference call bridges;
creating a second queue for the conference call bridge when the conference call bridge is associated with the higher number of agents;
assigning the at least one agent associated with the conference call bridge from the first queue to the second queue; and
increasing a priority of the at least one agent associated with a busier conference call bridge over agents associated with other conference call bridges by moving an assignment of the at least one agent up in the second queue.

15. A non-transitory computer readable medium comprising computer-executable instructions, that, when executed, cause at least one processor to:
create a first queue for a plurality of conference call bridges and assign a plurality of agents associated with the plurality of conference call bridges to the first queue;
determine whether a first conference call bridge of the plurality of conference call bridges is associated with a higher number of agents in the first queue than other conference call bridges;
create a second queue when the first conference call bridge is associated with the higher number of agents;
assign one or more agents associated with the first conference call bridge from the first queue to the second queue; and
increase a priority of agents associated with a busier conference call bridge over agents associated with other conference call bridges by moving an assignment of the one or more agents associated with the first conference call bridge up in the second queue.

16. The non-transitory computer readable medium of claim 15, further comprising instructions executable by the at least one processor for at least one of:
detecting authentication of one or more agents;
performing a single login for the one or more agents; and
automatically logging the one or more agents into the first conference call bridge.

17. The non-transitory computer readable medium of claim 16, further comprising instructions executable by the at least one processor for at least one of:
identifying the one or more agents for a private conference call; and
creating a third queue for a second conference call bridge.

18. The non-transitory computer readable medium of claim 17, further comprising instructions executable by the at least one processor for at least one of:
- assigning the one or more agents from the second queue to the third queue; and
- wherein the one or more agents associated with the second conference call bridge have a higher priority than one or more agents associated with the other conference call bridges in the third queue.

19. The non-transitory computer readable medium of claim 16, further comprising instructions executable by the at least one processor for at least one of:
- selecting the one or more agents for a private conference call; and
- holding the one or more agents in the second queue.

20. The non-transitory computer readable medium of claim 19, further comprising instructions executable by the at least one processor for at least one of:
- terminating a conference call of the first conference call bridge; and
- removing other participants of the conference call from the second queue.

* * * * *